Patented Sept. 11, 1945

2,384,574

UNITED STATES PATENT OFFICE 2,384,574

BUTADIENE-1,3 COPOLYMERS

William D. Stewart and Benjamin M. G. Zwicker, Akron, Ohio, assignors to The B. F. Goodrich Company, New York, N. Y., a corporation of New York No Drawing. Application May 26, 1942, Serial No. 444,597

14 Claims. (Cl. 260—84.5)

This invention relates to the preparation of rubber-like copolymers from mixtures of monomers comprising a butadiene-1,3, and particularly to the preparation of copolymers from mixtures containing at least three monomers in certain proportions, whereby synthetic rubber having unusually desirable properties may be obtained.

It is an object of this invention to prepare synthetic rubber latices which may be employed for dipping purposes because of the unusually high wet strength of films deposited therefrom. It is a further object of this invention to provide synthetic rubbers which are tough, yet are easily worked on a mill. It is a further object of this invention to provide synthetic rubbers which produce pure gum stocks having a high modulus. It is a further object of this invention to provide a method for the preparation of synthetic rubber which can be used in the production of a wide variety of industrial products for which natural rubber has been the only suitable raw material.

It is well known that dispersions resembling natural latex which are coagulable to form polymers resembling natural rubber can be prepared by the emulsion polymerization of butadienes-1,3, such as butadiene-1,3 isoprene, piperylene, 2,3-dimethylbutadiene, and 2-chlorobutadiene, either alone or in admixture with each other and/or with other monomers copolymerizable therewith in aqueous emulsion such as styrene, acrylonitrile, methacrylonitrile, methyl acrylate, methyl methacrylate, vinylidene chloride, methyl isopropenyl ketone, methyl vinyl ether, and other unsaturated hydrocarbons, esters, ketones, and ethers. We have discovered that by the inclusion of a small amount of a polymerizable organic compound which is capable of forming secondary cross-linkages in a butadiene-1,3 system, the resulting polymers have characteristic properties which increases their utility.

It is recognized that there are at least two kinds of valence bonds which link the atoms in chemical compounds. Primary valence bonds are present in compounds such as ethane, and apparently satisfy all of the combining power of the atoms in the compound. There are other compounds, however, which have some residual combining power, and contain groups which are capable of entering into loose chemical combination by means of secondary or coordinating valence bonds. The distance between atoms bound by secondary valences has been measured, and has been found to be from two to three times as great as the distance between atoms bound by primary valences.

The polymerizable organic compounds which are best known for their ability to form secondary cross-linkages between adjacent polymer chains and which are the preferred compounds of this invention are compounds containing a carbonyl group and a

group, preferably connected to each other or to the same carbon atom. Many polymerizable compounds containing these groups are copolymerizable with butadienes or with mixtures containing butadienes. As compounds which are illustrative of the types of compounds which may be employed may be mentioned polymerizable compounds containing the

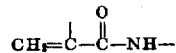

group such as N-methylacrylamide, N-phenyl-alpha-methacrylamide, N-methyl-alpha-ethylacrylamide, N-benzyl-alpha-methacrylamide, N-methyl-alpha-chloracrylamide, and particularly polymerizable compounds containing the group

such as acrylamide, alpha-methacrylamide, alpha-ethylacrylamide, alpha-phenylacrylamide, alpha-chloracrylamide, etc.

For the purposes of this invention, it is undesirable to use large amounts of the polymerizable organic compound capable of forming secondary cross-linkages, as the formation of too many inter- or intra-molecular secondary cross-linkages in a polymer tends to render it tough, insoluble, and unworkable. In practicing this invention, the compound containing groups capable of forming secondary cross-linkages should not be used in amounts above about 10 mol percent based on the polymerizable materials and ordinarily exerts the maximum beneficial effect when used in less than 5 mol percent. Appreciable beneficial effects are obtained, when much smaller amounts are used such as 0.5 mol percent or even 0.1 mol percent. The best results are ordinarily obtained when the compound containing groups capable of forming secondary cross-linkages is used in a copolymeric system comprising from 50 to 80 percent by weight of butadiene and from 20 to 50 percent by weight of a mono-olefinic monomer such as acrylonitrile, styrene, or methyl acrylate.

The invention may be better understood following the specific examples which are intended to illustrate rather than limit the invention.

Example I

A mixture of 88 parts by weight of butadiene and 72 parts of acrylonitrile was agitated for about 25 hours at 30° C. in the presence of about 210 parts of a 1.5% aqueous solution of an alkyl benzene sulfonate as an emulsifying agent, 0.54 part of hydrogen peroxide as an initiator, 0.96 part of diisopropyl dixanthogen as a modifier, and an activator prepared by dissolving in water 0.78 part of $Na_4P_2O_7 \cdot 10H_2O$, 0.01 part of $Fe_2(SO_4)_3 \cdot 7H_2O$, and 0.001 part of $CoCl_2 \cdot 6H_2O$. The resulting dispersion was stabilized by adding thereto an emulsion of an alkylated diarylamine. Films formed when the latex was spread on a glass plate and allowed to dry were not very plastic, and were rather weak both when wet and when dry. When the latex was coagulated with a solution of salt in alcohol and the washed and dried coagulum was cured in a tire tread recipe, the vulcanizate formed exhibited a tensile strength averaging 5075 lb./in.² and an elongation averaging 470%. When the experiment was repeated with the incorporation of 2.5 parts of alpha-methacrylamide in the recipe, the dried films exhibited a greater strength both when wet and when dry, and the vulcanizates exhibited an average tensile strength of 5650 lb./in.² and an average elongation of 545%. Dried films exhibiting even more desirable properties were obtained when the amount of alpha-methacrylamide was increased to 0.5%. The films deposited from latices formed when 10 parts of alpha-methacrylamide was employed were also strong, but the dried coagulated rubber did not break down well on a mill, and the vulcanizates did not exhibit as desirable properties as those prepared by the vulcanization of the above copolymers of butadiene and acrylonitrile prepared in the absence of any alpha-methacrylamide. Furthermore, the wet strength of films deposited on an impervious form coated with a coagulant was not as great when 10 parts of alpha-methacrylamide was employed in the preparation of the rubber as when 5 and 2.5 parts were employed. The inclusion of even 2.5 parts of alpha-methylacrylamide caused the deposition of much thicker film on a form coated with a coagulant than that deposited from the latex formed when no amide was included.

Example II

A mixture of 88 parts by weight of butadiene and 72 parts of acrylonitrile was agitated for about 8 hours at 40° C. in the presence of about 210 parts of a 1.5% aqueous solution of an alkyl benzene sulfonate as an emulsifying agent, 0.48 part hydrogen peroxide as an initiator, 0.96 part of diisopropyl dixanthogen as a modifier, and an activator prepared by dissolving in water 0.78 part of $Na_4P_2O_7 \cdot 10H_2O$, 0.015 part of $Fe_2(SO_4)_3 \cdot 7H_2O$, and 0.0015 part of $CoCl_2 \cdot 6H_2O$. The resulting dispersion was stabilized by adding thereto an emulsion of an alkylated diarylamine. Films formed when the latex was spread on a glass plate and allowed to dry were weak both when wet and dry. When the polymerization was repeated in the presence of 7.5 parts of acrylamide, however, the wet films obtained by spreading out the latex were much stronger, and the dry films were strong and tough. The latex prepared in the presence of the acrylamide was also more suitable for dipping operations than the latex prepared in the absence of any polymerizable compound capable of forming secondary cross-linkages.

Example III

A mixture of 111 parts by weight of butadiene, 40 parts of styrene, and 10.2 parts of alpha-methacrylamide was agitated until the polymerization was complete at 40° C. in the presence of about 210 parts of a 1.5% aqueous solution of an alkyl benzene sulfonate as an emulsifying agent, 0.35 part of hydrogen peroxide as an initiator, 0.72 part of diisopropyl dixanthogen as a modifier, and an activator prepared by dissolving in water 0.2 part of $Na_3PO_4 \cdot 12H_2O$, 0.975 part of $Na_4P_2O_7 \cdot 10H_2O$, 0.0275 part of $Fe_2(SO_4)_3 \cdot 7H_2O$, and 0.00275 part of $CoCl_2 \cdot 6H_2O$. The resulting dispersion was unusually stable, and resisted coagulation by mechanical means much better than dispersions prepared in the absence of a compound capable of forming secondary cross-linkages. The films obtained by drying the stabilized latex were dry and tough, yet the polymer broke down well on the mill. The latex was particularly suited for use in dipping operations because of the strength of the the films deposited therefrom.

Example IV

A mixture of 111 parts by weight of butadiene, 40 parts of methyl acrylate, and 10.2 parts of alpha-methacrylamide was agitated until the polymerization was complete in the presence of about 210 parts of a 1.5% aqueous solution of an alkyl benzene sulfonate as an emulsifying agent, 0.35 part of hydrogen peroxide as an initiator, 0.48 part of diisopropyl dixanthogen, as a modifier, and an activator prepared by dissolving in water 0.2 part of $Na_3PO_4 \cdot 12H_2O$, 0.975 part of $Na_4P_2O_7 \cdot 10H_2O$, 0.025 part of $Fe_2(SO_4)_3 \cdot 7H_2O$, and 0.0025 part of $CoCl_2 \cdot 6H_2O$. Although copolymers of butadienes and acrylates ordinarily produce weak, tender films, the films obtained by drying the stabilized latex obtained above were exceptionally tough.

Although the compound capable of forming secondary cross-linkages has been included with the other monomer at the beginning of the polymerization, it may be added during or near the end of the polymerization if desired. Particularly good results may be obtained by adding a small amount of a material such as acrylamide when the polymerization is 75 or 80 percent complete and continuing the polymerization until it is complete. The polymerizable compound should not be added after the polymerization is so nearly finished that the compound fails to enter the growing polymeric chains, however, for the product will be a mixture of polymers rather than a true copolymer.

The polymerization may be effected in the presence of any desired emulsifying agents such as water-soluble soaps including sodium oleate, potassium palmitate and sodium myristate, or synthetic emulsifying agents such as hymolal sulfates and alkaryl sulfonates including sodium lauryl sulfate and sodium isopropyl naphthalene sulfonate. When the dispersion is to be employed to deposit thin films upon a form, it is often advantageous to include in the emulsion during or after the polymerization a non-electrolytic emulsifying agent such as a material containing either a long aliphatic chain or an aromatic group solubilized with a chain of $(O-CH_2-CH_2)_n$ groups preferably terminating with a hydroxyl group. These compounds are in general prepared by condensation reactions of higher alcohols or aromatic compounds with ethylene oxide. The preparation of one such class of non-electrolytic emulsifying agents is described in U. S. Patent 2,222,967.

The polymerization is preferably conducted in the presence of a small amount of a heavy metal catalyst. The heavy metal catalyst may be added to the emulsion in the form of less than 0.1% based on the weight of the monomers of a simple ionizable heavy metal salt such as cobalt chloride or nickel sulfate as disclosed in the copending application of William D. Stewart, Serial No. 379,712, filed February 14, 1941, or in the form of a complex of a heavy metal and a material such as sodium pyrophosphate, levulinic acid, glycine, cystine, beta-mercaptoethanol, quebrachitol, oxbile or cholesterol, as disclosed in the copending applications of William D. Stewart, Serial Nos. 379,713 to 379,717, filed February 14, 1941.

The polymerization may be effected by various initiators of polymerization such as per-compounds including hydrogen peroxide, ammonium persulfate, potassium persulfate and other peroxides and persalts such as persulfates, perborates, percarbonates and the like as well as other types of initiators such as diazoaminobenzene, dipotassium diazomethane disulfonate and triphenylmethylazobenzene.

Sulfur-containing organic compounds herein called modifiers which increase the plasticity and solubility of the polymers such as dialkyl dixanthogens, tetraalkyl thiuram mono- and polysulfides, mercaptoalkylthiazoles, alkyl mercaptans, etc., are also preferably present in the emulsion during the polymerization.

The synthetic rubber latices prepared by the method of this invention may be coagulated by electronic deposition processes employing electric currents or electrolytes in much the same manner as natural latex. For example, an impervious form may be dipped in a suitable coagulant such as an aqueous or alcoholic solution of a multivalent metallic salt and then dipped into the synthetic rubber latex to deposit a strong, elastic film. If the latex has been suitably compounded prior to coagulation, the films may be vulcanized in hot water or steam. It will in general be found that the synthetic rubber latices prepared by the method of this invention resemble natural latex to such an extent that it is not necessary to develop special techniques to be used in connection with the compounding, deposition and vulcanization of the synthetic materials.

Many modifications and variations which will be apparent to those skilled in the art are within the spirit and scope of the invention as defined in the appended claims.

We claim:

1. The method which comprises subjecting to emulsion polymerization a mixture comprising three different monomers copolymerizable in aqueous emulsion, one of said monomers, present in at least 50 weight percent of said mixture, consisting of a butadiene-1,3, another of said monomers, present in a small amount but not over 10 mol. percent of said mixture, consisting of an amide of a monocarboxylic acid having a methylene group attached by an olefinic double bond to the alpha carbon atom, and the third of said monomers, making up the remainder of said mixture, consisting of an unsaturated compound selected from the class consisting of styrene, acrylonitrile, methacrylonitrile, methylacrylate, methyl methacrylate, vinylidene chloride, methyl isopropenyl ketone and methyl vinyl ether.

2. The method which comprises subjecting to emulsion polymerization a mixture comprising three different monomers copolymerizable in aqueous emulsion, one of said monomers, present in at least 50 weight percent of said mixture, consisting of butadiene-1,3, another of said monomers, present in a small amount but not over 10 mol. percent of said mixture, consisting of a monocarboxylic acid amide having a methylene group attached by an olefinic double bond to a carbon atom in turn attached to a carbonyl group, and the third of said monomers, making up the remainder of said mixture, consisting of an unsaturated compound selected from the class consisting of styrene, acrylonitrile, methacrylonitrile, methyl acrylate, methyl methacrylate, vinylidene chloride, methyl isopropenyl ketone and methyl vinyl ether.

3. The method which comprises subjecting to emulsion polymerization a mixture comprising three different monomers copolymerizable in aqueous emulsion, one of said monomers, present in from 50 to 80 weight percent of said mixture, consisting of a butadiene-1,3, another of said monomers, present in a small amount but not over 10 mol. percent of said mixture, consisting of an amide of a monocarboxylic acid having a methylene group attached by an olefinic double bond to the alpha carbon atom, and the third of said monomers, present in from 20 to 50 weight percent of said mixture, consisting of an unsaturated compound selected from the class consisting of styrene, acrylonitrile, methacrylonitrile, methyl acrylate, methyl methacrylate, vinylidene chloride, methyl isopropenyl ketone and methyl vinyl ether.

4. The method which comprises subjecting to emulsion polymerization a mixture comprising three different monomers copolymerizable in aqueous emulsion, one of said monomers, present in from 50 to 80 weight percent of said mixture, consisting of butadiene-1,3, another of said monomers, present in from 20 to 50 weight percent of said mixture, consisting of acrylonitrile, and the third of said monomers present in a small amount but not over 10 mol. percent of said mixture, consisting of an amide of a monocarboxylic acid having a methylene group attached by an olefinic double bond to the alpha carbon atom.

5. The method which comprises subjecting to emulsion polymerization a mixture comprising three different monomers copolymerizable in aqueous emulsion, one of said monomers, present in from 50 to 80 weight percent of said mixture, consisting of butadiene-1,3, another of said monomers, present in from 20 to 50 weight percent of said mixture, consisting of styrene, and the third of said monomers present in a small amount but not over 10 mol. percent of said mixture, consisting of an amide of a monocarboxylic acid having a methylene group attached by an olefinic double bond to the alpha carbon atom.

6. The method which comprises subjecting to emulsion polymerization a mixture comprising three different monomers copolymerizable in aqueous emulsion, one of said monomers, present in from 50 to 80 weight percent of said mixture consisting of butadiene-1,3, another of said monomers, present in from 20 to 50 weight percent of said mixture, consisting of an unsaturated compound selected from the class consisting of styrene, acrylonitrile, methacrylonitrile, methyl acrylate, methyl methacrylate, vinylidene chloride, methyl isopropenyl ketone and methyl vinyl ether, and the third of said monomers, present in a small amount but not over 10 mol. percent of said mixture, consisting of alpha-methacrylamide.

7. The method which comprises subjecting to emulsion polymerization a mixture of monomers copolymerizable in aqueous emulsion, said mixture of monomers comprising between 50 and 80 weight percent of butadiene-1,3, between 20 and 50 weight percent of acrylonitrile, and a small amount, but not over about 5 mol percent, of alpha-methacrylamide.

8. The method which comprises subjecting to emulsion polymerization a mixture of monomers copolymerizable in aqueous emulsion, said mixture of monomers comprising between 50 and 80 weight percent of butadiene-1,3 between 20 and 50 weight percent of styrene, and a small amount, but not over about 5 mol percent, of alpha-methacrylamide.

9. The method which comprises subjecting to emulsion polymerization a mixture of monomers copolymerizable in aqueous emulsion, said mixture of monomers comprising between 50 and 80 weight percent of butadiene-1,3, between 20 and 50 weight percent of acrylonitrile, and a small amount, but over about 5 mol percent, of acrylamide.

10. A composition of matter prepared by the method of claim 1.

11. A composition of matter prepared by the method of claim 3.

12. A composition of matter prepared by the method of claim 7.

13. A composition of matter prepared by the method of claim 8.

14. A composition of matter prepared by the method of claim 9.

WILLIAM D. STEWART.
BENJAMIN M. G. ZWICKER.

Certificate of Correction

Patent No. 2,384,574.   September 11, 1945.

WILLIAM D. STEWART ET AL.

It is hereby certified that errors appear in the printed specification of the above numbered patent requiring correction as follows: Page 2, second column, line 39, for "butadienes" read *butadiene*; page 4, second column, line 6, claim 9, for "but over about" read *but not over about*; and that the said Letters Patent should be read with these corrections therein that the same may conform to the record of the case in the Patent Office.

Signed and sealed this 5th day of November, A. D. 1946.

[SEAL]

LESLIE FRAZER,
*First Assistant Commissioner of Patents.* a small amount but not over 10 mol. percent of said mixture, consisting of alpha-methacrylamide.

7. The method which comprises subjecting to emulsion polymerization a mixture of monomers copolymerizable in aqueous emulsion, said mixture of monomers comprising between 50 and 80 weight percent of butadiene-1,3, between 20 and 50 weight percent of acrylonitrile, and a small amount, but not over about 5 mol percent, of alpha-methacrylamide.

8. The method which comprises subjecting to emulsion polymerization a mixture of monomers copolymerizable in aqueous emulsion, said mixture of monomers comprising between 50 and 80 weight percent of butadiene-1,3 between 20 and 50 weight percent of styrene, and a small amount, but not over about 5 mol percent, of alpha-methacrylamide.

9. The method which comprises subjecting to emulsion polymerization a mixture of monomers copolymerizable in aqueous emulsion, said mixture of monomers comprising between 50 and 80 weight percent of butadiene-1,3, between 20 and 50 weight percent of acrylonitrile, and a small amount, but over about 5 mol percent, of acrylamide.

10. A composition of matter prepared by the method of claim 1.

11. A composition of matter prepared by the method of claim 3.

12. A composition of matter prepared by the method of claim 7.

13. A composition of matter prepared by the method of claim 8.

14. A composition of matter prepared by the method of claim 9.

WILLIAM D. STEWART.
BENJAMIN M. G. ZWICKER.

Certificate of Correction

Patent No. 2,384,574.  September 11, 1945.

WILLIAM D. STEWART ET AL.

It is hereby certified that errors appear in the printed specification of the above numbered patent requiring correction as follows: Page 2, second column, line 39, for "butadienes" read *butadiene*; page 4, second column, line 6, claim 9, for "but over about" read *but not over about*; and that the said Letters Patent should be read with these corrections therein that the same may conform to the record of the case in the Patent Office.

Signed and sealed this 5th day of November, A. D. 1946.

[SEAL]

LESLIE FRAZER,
*First Assistant Commissioner of Patents.*